United States Patent [19]

Furuno

[11] Patent Number: 5,146,614
[45] Date of Patent: Sep. 8, 1992

[54] RADIO TRANSCEIVER APPARATUS WITH BOOSTER

[75] Inventor: Kenichi Furuno, Hyogo, Japan

[73] Assignee: Mitsubishi Denki Kabushiki Kaisha, Tokyo, Japan

[21] Appl. No.: 455,156

[22] Filed: Dec. 22, 1989

[30] Foreign Application Priority Data

Apr. 10, 1989 [JP] Japan .................................... 1-88104

[51] Int. Cl.$^5$ ........................... H04B 1/38; H04B 1/04
[52] U.S. Cl. ...................................... 455/89; 455/90; 455/127; 455/128
[58] Field of Search ........................ 455/15, 19, 73, 84, 455/89, 90, 127–129

[56] References Cited

U.S. PATENT DOCUMENTS

| | | | |
|---|---|---|---|
| 4,095,184 | 6/1978 | Hochstein et al. | 455/73 |
| 4,654,882 | 3/1987 | Ikeda | 455/89 |
| 4,709,404 | 11/1987 | Tamura et al. | 455/73 |
| 4,870,698 | 9/1989 | Katsuyama et al. | 455/127 |

*Primary Examiner*—Curtis Kuntz
*Assistant Examiner*—Andrew Faile
*Attorney, Agent, or Firm*—Rothwell, Figg, Ernst & Kurz

[57] ABSTRACT

Disclosed is a booster apparatus wherein a detected signal which an input power detecting means outputs is subjected to a fixed processing and made to be a reference voltage for level-setting, and a transmitting level setting means controls the gain of an amplifier in such a manner that a detected signal which a transmitting power detecting means outputs and the reference voltage are balanced with each other.

22 Claims, 10 Drawing Sheets

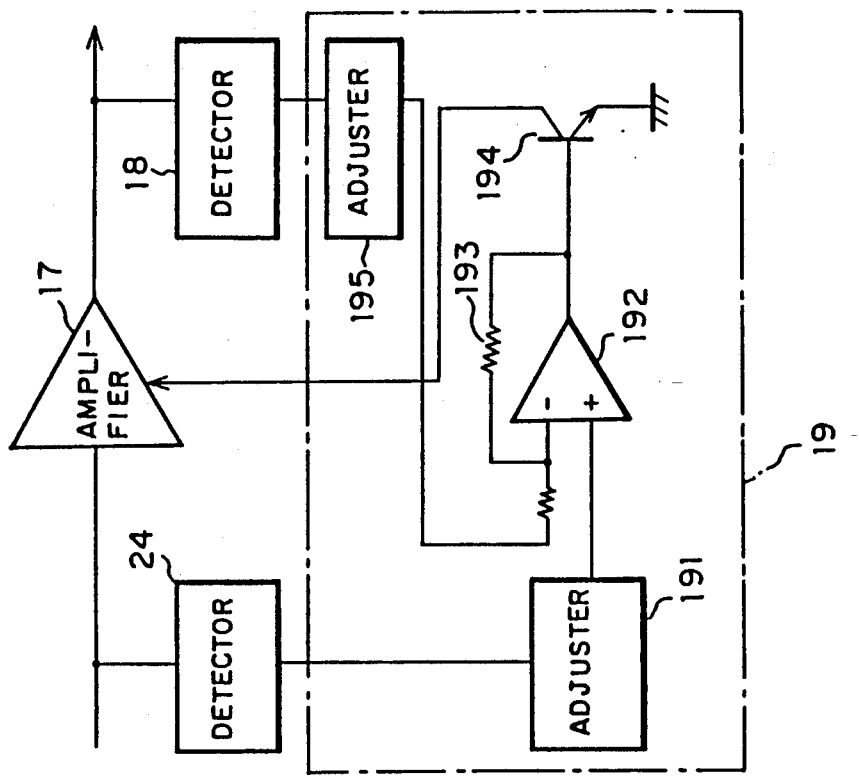
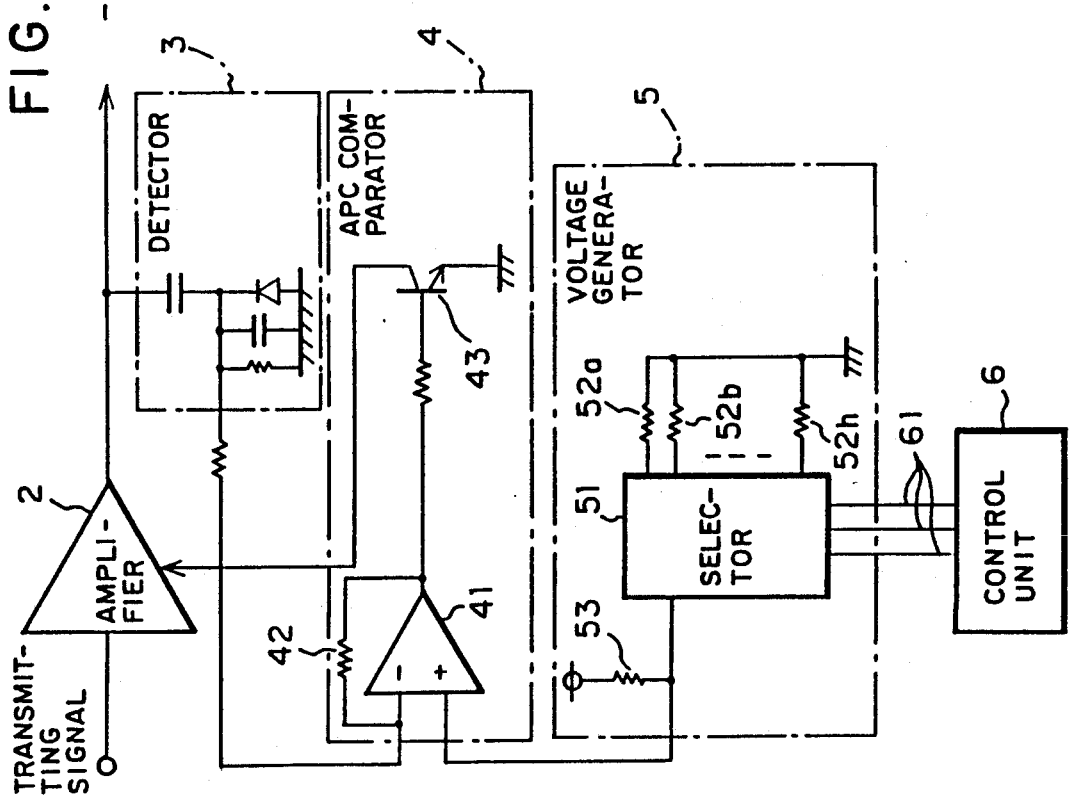
FIG. 3

FIG. 4

| LEVEL INFORMATION | CLASS I | CLASS III | RESISTOR |
|---|---|---|---|
| 0 0 0 | 6 | -2 | |
| 0 0 1 | 2 | -2 | |
| 0 1 0 | -2 | -2 | 52a |
| 0 1 1 | -6 | -6 | 52b |
| 1 0 0 | -10 | -10 | 52c |
| 1 0 1 | -14 | -14 | 52d |
| 1 1 0 | -18 | -18 | 52e |
| 1 1 1 | -22 | -22 | 52f |
| | | -26 | 52g |
| | | -30 | 52h |

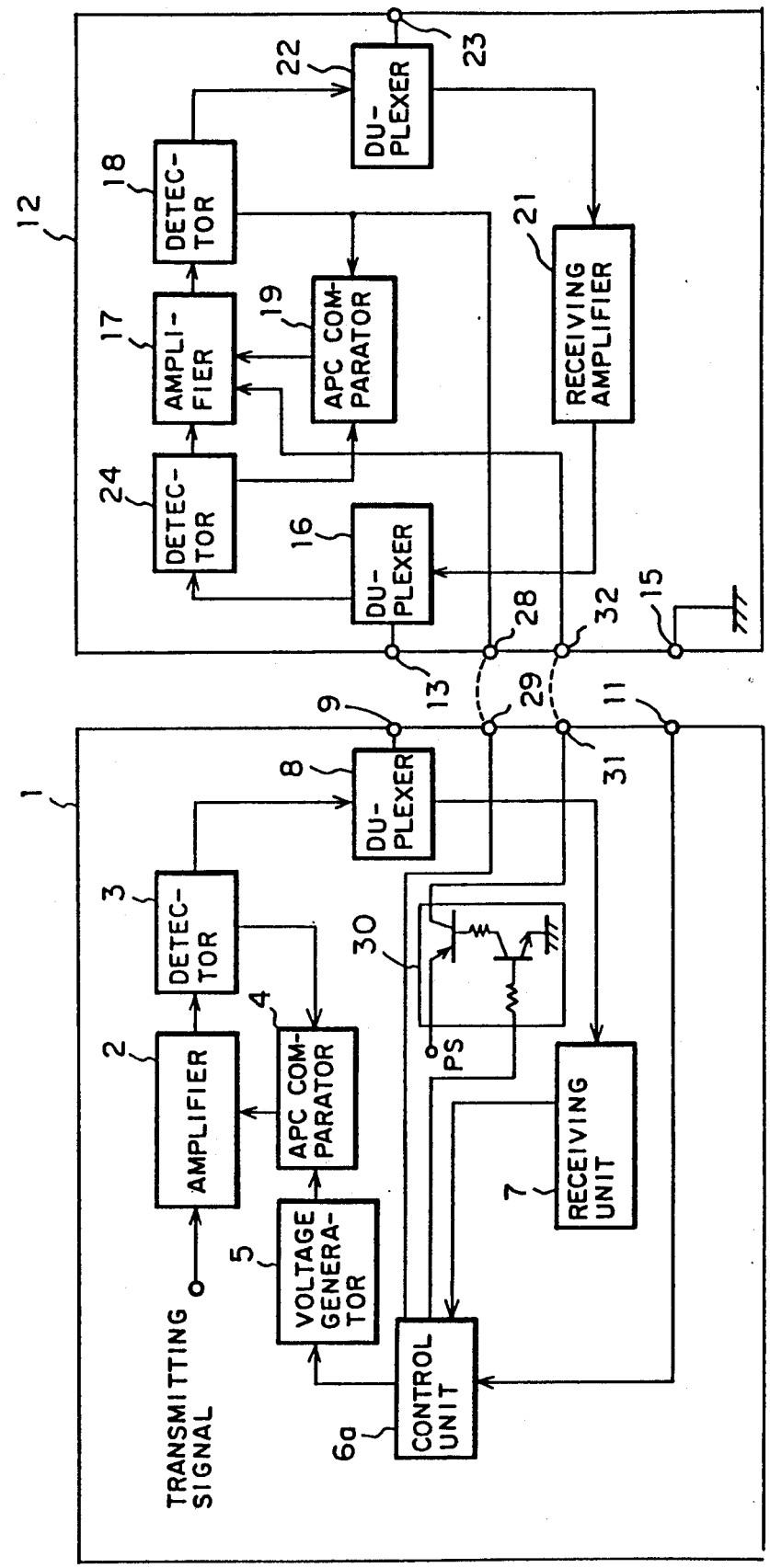

RADIO TRANSCEIVER APPARATUS WITH BOOSTER

BACKGROUND OF THE INVENTION

This invention relates to a booster apparatus which amplifies a transmitting signal of a radio transceiver and sends it out from an antenna, and to a radio transceiver to which the booster apparatus is connected.

DESCRIPTION OF THE PRIOR ART

FIG. 1 is a block diagram showing a conventional transceiver and a conventional booster apparatus. In FIG. 1, reference numeral 1a denotes a radio transceiver, in which 2 is an amplifier which amplifies a transmitting signal. Detector 3 detects an output signal of the amplifier 2 and an automatic power control comparator 4 controls the gain of amplifier 2 (hereinafter called an APC comparator). Voltage generator 5 provides a reference voltage to the APC comparator 4, and 6a is a control unit which produces an operational class signal and a selection signal representing a specified power level. Receiving unit 7 demodulates a received signal from a duplexer 8. Furthermore, duplexer 8 outputs the output signal of the amplifier 2 to an antenna connecting terminal 9, and at the same time, outputs a received signal inputted from the antenna connecting terminal 9 to the receiving unit 7. Control terminal 10 outputs a transmitting output control signal from control unit 6a to a Booster apparatus 12a, and 11 is a detection terminal for detecting the connection of the booster apparatus 12a. Booster apparatus 12a has a signal terminal 13 which is connected to the antenna connecting terminal 9 of the radio transceiver 1a. Signal input terminal 14 has inputted the transmitting output control signal from control terminal 10, and connecting terminal 15 is connected to the detection terminal 11. Connections are schematically illustrated by the dotted lines. Duplexer 16 outputs a transmitting signal received from signal terminal 13 to an amplifier 17 and also outputs a received signal to the signal terminal 13. Amplifier 17 amplifies the transmitting signal inputted from the duplexer 16, and detector 18 detects an output signal of the amplifier 17. APC comparator 19a controls the gain of the amplifier 17, and voltage generator 20 provides a reference voltage to the APC comparator 19a. Receiving amplifier 21 amplifies a received signal from duplexer 22 and outputs it to the duplexer 16. Duplexer 22 also supplies an output signal of the amplifier 17 to an antenna connecting terminal 23 for the booster apparatus, and also supplies a received signal inputted from the antenna connecting terminal 23 for the booster apparatus to the receiving amplifier 21.

The operation of the prior art radio transceiver and booster apparatus will be described hereinafter. Communication is performed by the radio transceiver alone when the booster apparatus 12a is not connected to it. In such case, a transmitting signal is amplified by the amplifier 2 and sent out via the duplexer 8 and the antenna connecting terminal 9 to an antenna (not shown). The detector 3 detects the output signal of the amplifier 2. For reception purposes, received signals received by the antenna are inputted through terminal 9 via the duplexer 8 to the receiving unit 7. The receiving unit 7 demodulates the received signal and outputs information on the transmitting output level to the control unit 6a. The received signal includes information on the transmitting output level (hereinafter called level information) which is sent out from a base station to indicate a transmitting output level for the radio transceiver. The control unit 6a outputs a selection signal corresponding to the received level information to the voltage generator 5. The voltage generator 5 generates a reference voltage corresponding to the selection signal and outputs it to the APC comparator 4. The APC comparator 4 controls the gain of the amplifier 2 in such a manner that the detected signal fed back from the detector 3 and the reference voltage output from the voltage generator 5 are equal. In this way, the control for setting the output level of the transceiver's transmission output signal consistent with the transmitting output level directed from the base station is accomplished.

When the booster apparatus 12a is connected to the radio transceiver 1a, the antenna connecting terminal 9 is connected to the signal terminal 13 and the detection terminal 11 is connected to the connecting terminal 15. At the same time, the control terminal 10 is connected to the signal input terminal 14. These connections are illustrated by the dotted lines. The control unit 6a detects the connection of the connecting terminal 15 to the radio transceiver 1a. As a result, the connection of the booster apparatus to the radio transceiver alters the operational class of the transmitting output level. Since the connection of the booster apparatus 12a allows the transmitting output level to be raised, a change in the operational class occurs. A signal representing the transmitting output level is therefore produced and transmitted to the base station by a transmission unit not shown. The transmitting output level of transceiver 1a can then be controlled on the side of the booster apparatus 12a. Specifically, the voltage generator 5 generates the reference voltage and that the signal level of the output signal of the amplifier 2 becomes equal to an input level of the amplifier 17 on the side of the booster apparatus 12a. The reference voltage in this case is in accordance with the instruction of the control unit 6a and it is a fixed value when the booster apparatus 12a is connected. The control unit a thus outputs a fixed value selection signal in accordance with the level information from receiving unit 7 such that the voltage generator 5 generates a fixed reference voltage. Further, the level information is transmitted from control unit 6a via the control terminal 10 and the signal input terminal 14 to the voltage generator 20 on the side of the booster apparatus 12a. The voltage generator 20 on the side of the booster apparatus 12a thus generates a reference voltage "in accordance" with such level information as received from control unit 6a. The APC comparator 19a on the side of the booster apparatus 12a receives a reference voltage and the detected signal of the detector 18 to set gain of the amplifier 17. In this way, the transmitting signal which has a fixed signal level output from the radio transceiver 1a is boosted to become equal to a transmitting output level specified from the base station. The boosted signal is sent out via the duplexer 22 on the side of the booster apparatus 12a through the antenna connecting terminal 23 from an antenna (not shown). The received signal from the base station via connecting terminal 23 and duplexer 22 is inputted to the radio transceiver 1a after the attenuation inside the booster apparatus 12a is compensated by the receiving amplifier 21. Since the conventional booster apparatus and radio transceiver are constructed as described above, various problems have resulted. Specifically, cables between the radio transceiver 1a and the booster apparatus 12a and a plurality of control lines in the booster apparatus 12a and the radio transceiver 1a are needed in order to transfer the level information (control signal). Also, a circuit for controlling multistage transmitting levels is needed in the booster apparatus 12a.

SUMMARY OF THE INVENTION

This invention is devised to solve the aforementioned problems, and its object is to obtain a booster apparatus in operation with a radio transceiver which is simplified by eliminating the control signal between the booster apparatus and the radio transceiver and by reducing transmitting level controls in the booster apparatus.

Further, it is an object of the invention to provide a radio transceiver which can prevent unlawful signals from being sent out from a booster apparatus.

According to an embodiment of the present invention for carrying out the above-mentioned objects, there is provided a booster apparatus, in which a transmitting power detecting means for detecting a signal level of an output signal from an amplifier is provided, and wherein an input power detecting means for detecting a signal level of an input signal to the amplifier is provided. Also, transmitting level setting means is provided which sets the gain of the amplifier so as to maintain fixed relation between the output signal level of the amplifier and the output signal from the input power detecting means by inputting each detected output signal into the transmitting level setting means.

Other objects and advantages will be apparent from the detailed description of the following embodiments with reference to accompanying drawings.

BRIEF DESCRIPTION OF THE DRAWINGS

FIG. 3 is a circuit diagram showing a detailed configuration of the voltage generator, the APC comparator, and the detector of the embodiment of FIG. 2;

FIG. 4 is a diagram showing one example of the relationship between level information and a transmitting level;

FIG. 9 and FIG. 10 are block diagrams showing radio transceivers according to other embodiments of this invention; and FIG. 10a is a diagram showing the level deciding circuit in the booster apparatus.

DETAILED DESCRIPTION OF A PREFERRED EMBODIMENT

Figure 1:
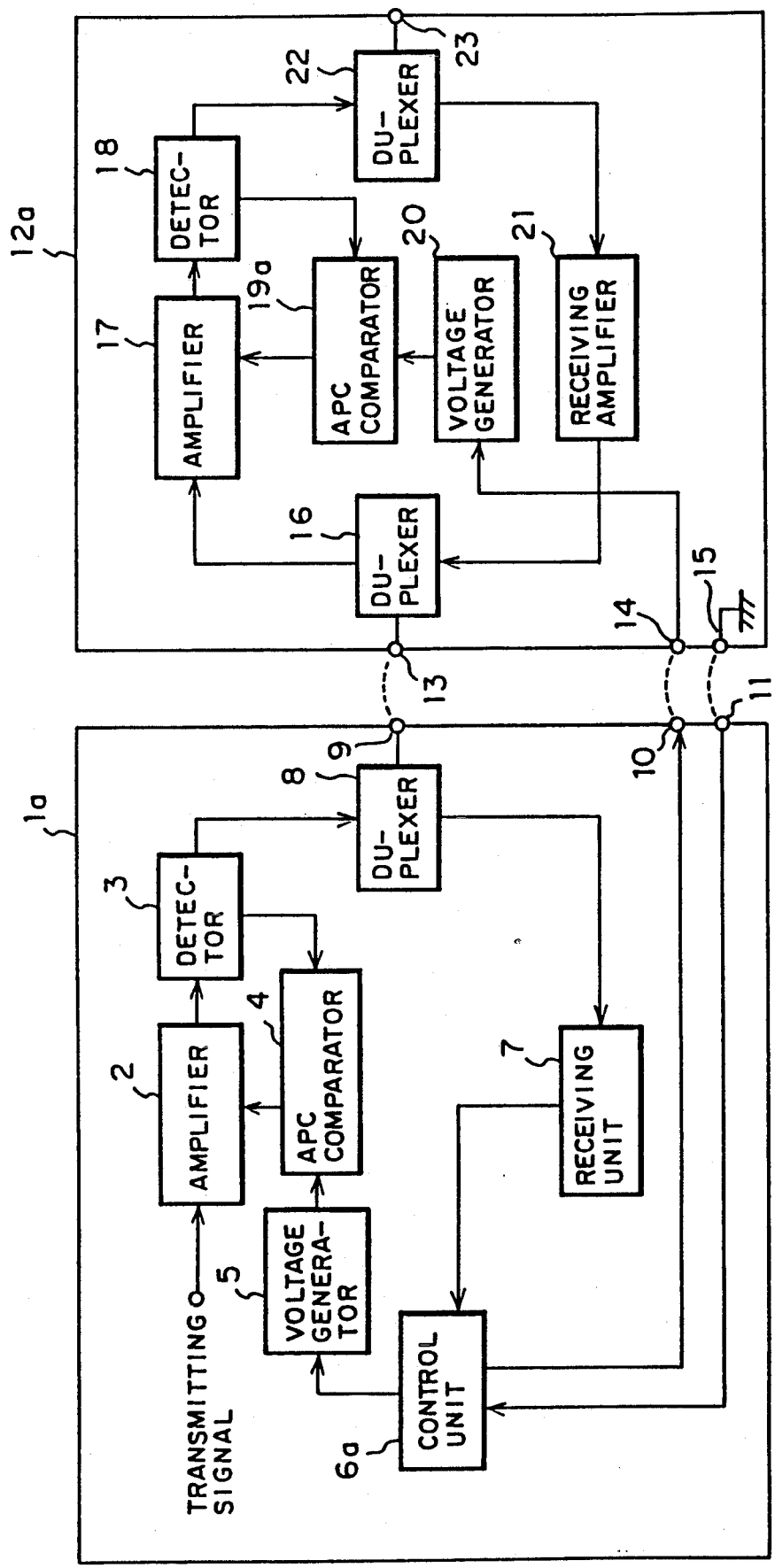
FIG. 1 is a block diagram showing a conventional booster apparatus and a radio transceiver.
Figure 2:
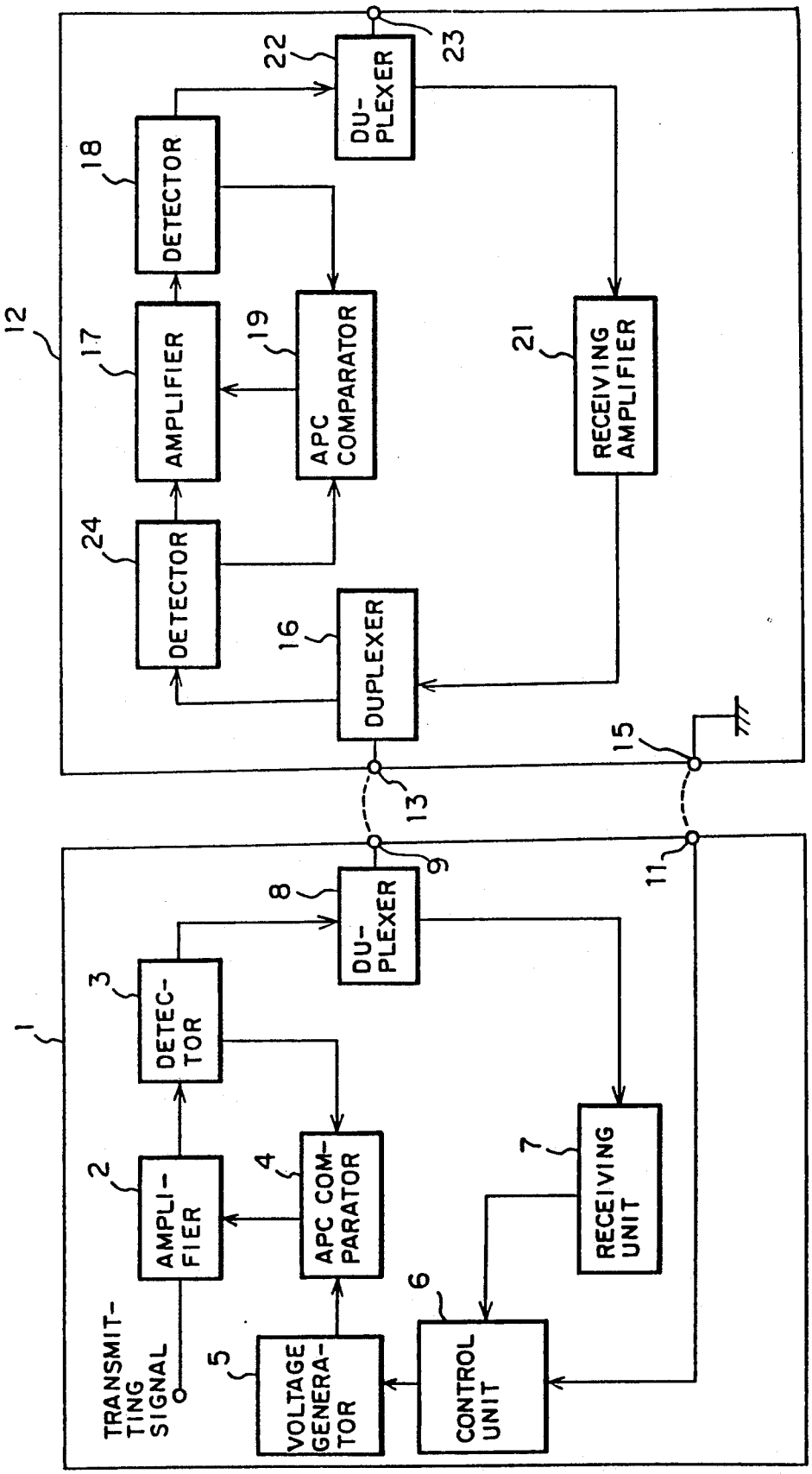
FIG. 2 is a block diagram showing a booster apparatus and a radio transceiver according to one embodiment of this invention.

A preferred embodiment of this invention will be described with reference to drawings. In FIG. 2, reference numeral 6 is a control unit in radio transceiver 1 having a power level selecting means, 19 is an APC comparator provided in booster apparatus 12, and 24 is a detector provided on the input side of the amplifier 17. The other parts are identified by the same numerals as those in FIG. 1 and are the same as those shown in FIG. 1. In the embodiment of FIG. 2, it is not necessary to provide the control terminal 10, the signal input terminal 14, and the voltage generator 20 which are provided in the conventional system. As illustrated in FIG. 2, the signal received from the base station is inputted at antenna connecting terminal 23 and is received in transceiver 1 via receiving amplifier 21, duplexer 16, signal terminal 13 to antenna connecting terminal 9. The signal transmitted from amplifier 2 is inputted to booster 12 via the signal terminal 13 to duplexer 16 and to the detector 24.

FIG. 3 is a circuit diagram showing a portion of the circuit of APC comparator 4 of the radio transceiver 1 and a portion of the circuit of APC comparator 19 of the booster apparatus 12 in detail. In FIG. 3, reference numeral 41 is an operational amplifier which is provided with a reference voltage supplied from the voltage generator 5 and a detected signal of the detector 3 to control gain of the amplifier 2, 42 is a feedback resistor, 43 is a transistor which amplifies an output signal of the operational amplifier 41. Selector 51 in voltage generator 5 connects one of resistors 52a–52h in accordance with a selection signal 61 outputted from the control unit 6 and 53 is a voltage dividing resistor which produces a reference voltage by dividing the power source voltage together with the resistors 52a–52h connected to the output side of the selector 51.

Also, reference numeral 192 is an operational amplifier for controlling the gain of the amplifier 17. Adjuster 191 and 195 amplify or reduce the signal level from detectors 24 and 18 relative to a reference voltage produced by the adjusters. One input signal of the operational amplifier 192 is obtained by level-adjusting using the second adjuster 195, the detected signal being obtained by detecting the signal level of the output signal of the amplifier 17 which is outputted from the detector 18. The other input signal of operational amplifier 192 is obtained using an adjuster 191 which adjusts a detected signal output from the detector 24 in accordance with its reference voltage. Adjuster 191 adjusts the level of a detected signal output from the detector 24 in relation to the reference voltage produced by the adjuster. In the embodiment of FIG. 2, the detector 3 in the radio transceiver 1 operates as an output power detecting means, the APC comparator 4 and the voltage generator 5 operate as a second transmitting level setting means. In the booster apparatus 12, the detector 24 operates as an input power detecting means, detector 18 operates as a transmitting power detecting, and the APC comparator 19 operates as a transmitting level setting means.

The operation of the apparatus embodied in FIG. 2 will be described hereinafter. In the case where the booster apparatus 12 is not connected to the radio transceiver, the radio transceiver 1 performs the communication operation the same as that in the conventional case.

In the case where the booster apparatus 12 is connected to the radio transceiver 1, the detection terminal 11 is connected to the connecting terminal 15, and the antenna connecting terminal 9 is connected to the signal terminal 13 as shown by the dotted lines in FIG. 2. The control unit 6 detects that the connecting terminal 15 is connected, and that the booster apparatus 12 is connected to the radio transceiver 1. The operational class of the transceiver is altered in the same way as in the conventional case and as will be discussed with reference to FIG. 4. The control unit 6 conducts the same control as that in the case where only the radio transceiver 1 performs communication.

Specifically, level information included in the received signal is received via the booster apparatus 12 and the antenna connecting terminal 9. Then, the selection signal 61 corresponding to the level information is outputted to the voltage generator 5 as shown in FIG. 3. The selector 51 in the voltage generator 5 selects the resistors 52a–52h corresponding to the level information in accordance with the selection signal 61. The resistance values need only be set which correspond to the transmitting output levels in operational class III as shown in FIG. 4. The selected resistors 52a–52h and the voltage dividing resistor 53 produce a reference voltage, which is inputted to the operational amplifier 41 in the APC comparator 4. The operational amplifier 41 is also supplied with the detected signal of the detector 3. The output signal of amplifier 41 is thus automatically adjusted until both input signals are balanced with each other. The output signal of amplifier 41 is amplified by the transistor 43 to control the power gain of the amplifier 2. The transmitting signal which is supplied from the radio transceiver 1 to the booster apparatus 12 is provided with a transmitting output level corresponding to the level information received from the base station.

As described above, the transmitting signal corresponding to the level information is inputted via the signal terminal 13 and the duplexer 16 to the detector 24 in the booster apparatus 12. The detector 24 generates a DC voltage corresponding to the signal level of the transmitting signal; in short, the detection 24 generates a detected signal and outputs it to the adjuster 191 of APC comparator as shown in FIG. 3.

The amplifier 17 amplifies the input transmitting signal with the fixed gain in such a manner that the transmitting output level of the transmitting signal becomes equal to a transmitting output level specified from the base station. Therefore, the signal level of the output signal of the amplifier 17 as a detected signal of the detector 18 is inputted to the APL comparator 19. Here, the detected signal from detector 18 is level-adjusted by the second adjuster 195. The adjuster 191 provides a fixed amplification or attenuation, with respect to its reference voltage, to the output signal of the detector 24 in such a manner that the signal produced by the operational amplifier 192 and the transistor 194 enables a fixed gain of the amplifier 17. The operational amplifier 192 controls the gain of the amplifier 17 in such a manner that the reference voltage produced by the adjuster 191 operating as described above and the detected signal of the detector 18 are balanced with each other. As described above, the transmitting output level of the output signal of the amplifier 17 is consistent with the value specified by the level information from the base station. Booster apparatus 12 therefore alters the transceiver's signal from a class III to a class I and provides a final boost in the output level.

FIG. 4 shows one example of the relation between the class and the level information in a radio communication system. For instance, the level information "000" specifies the transmitting output level to be 6dBW in the class I, and $-2$dBW in the class III. In such a system, the resistance values of the resistors 52a–52h in the voltage generator 5 need only to be set to values corresponding to the transmitting output levels in the class III, respectively. In the case where only the radio transceiver 1 performs communication, the communication based on the class III, six kinds of resistors 52a–52f are left to select. For instance, in the case where two pieces of level information "101" and "000" are received from the base station, the control unit 6 needs only output a selection signal which selects the resistor 52d and the resistor 52a, respectively. On the other hand, after the booster apparatus 12 is connected to the radio transceiver 1 and the class III is altered to the class I, eight kinds of resistors 52a–52h are left to select. For instance, in the case and "111" are received, the control unit 6 needs only to output a selection signal which selects the resistor 52a, the resistor 52b, and the resistor 52h. In other words, the control unit 6 is left to have a same level selection means which selects the resistors 52a–52h in the order of the transmitting output levels irrespective of the class. Such a constitution of the control unit causes the signal level of the transmitting signal output from the antenna connecting terminal 9 of the radio transceiver 1 to be lower by 8dB than the value specified from the base station. Then, the input transmitting signal may be raised by 8dB in the amplifier 17 in the booster apparatus 12. In short, the adjuster 191 adjusts the detected signal of the detector 24 in such a manner that the amplifier 17 amplifies the input transmitting signal by 8dB.

Figure 5:
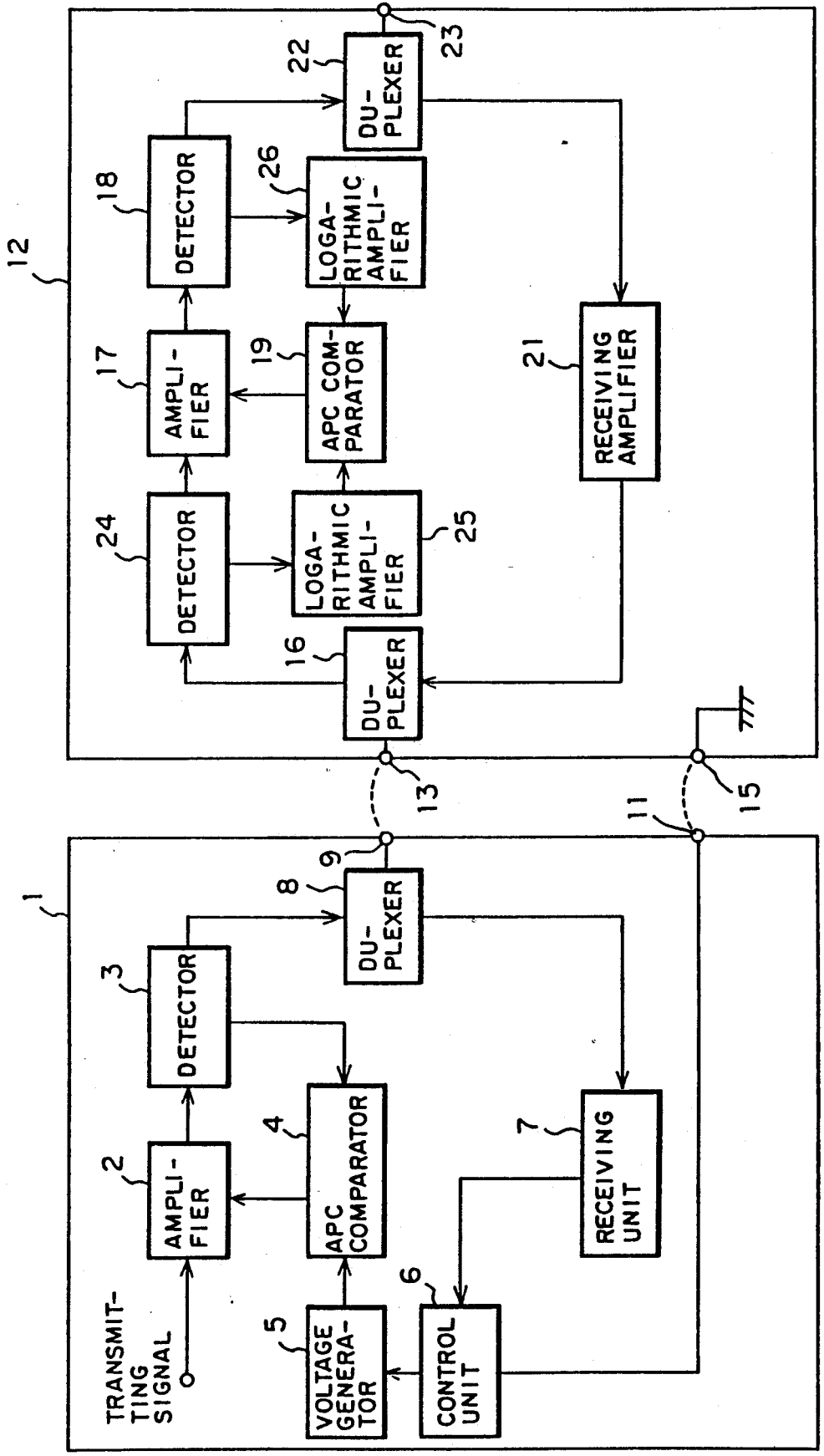
FIG. 5 and FIG. 7 are block diagrams showing booster apparatus and radio transceivers according to further embodiments of this invention.
Figure 6A:
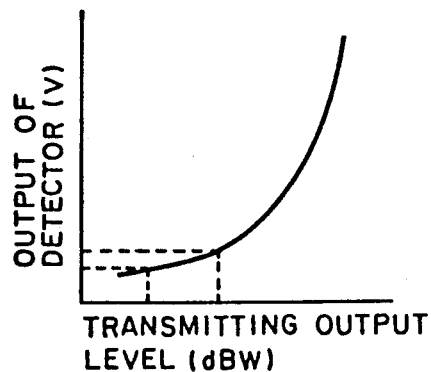
FIGS. 6A-6B and 8A-8D are output diagrams showing one example of the relation between an output signal of a detector and a transmitting output level and the relation between an output signal of a logarithmic amplifier and an operational amplifier and a transmitting output level.
Figure 6B:
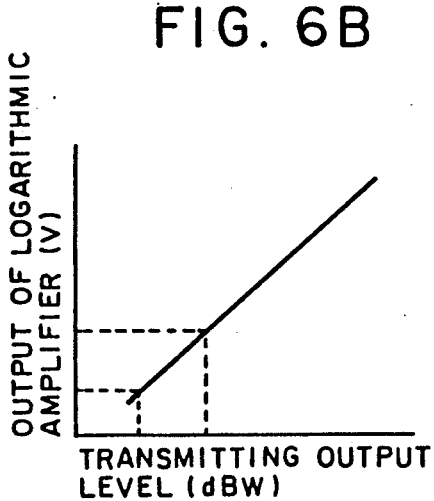

The present invention can also be modified to handle the case where the transmitting output level as in the above case where it is set to $-30$dBW. At such low transmitting output level, the signals output from the detector 18 and 24 become distorted. As a result, there is a possibility that the signal level of the output signal of the amplifier 17 is out of the operating specification. The logarithmic amplifier 25 and 26, as shown in FIG. 5, are added as an input power detecting means and a transmitting power detecting means between the detector 24 and the APC comparator 19 and between the detector 18 and the APC comparator 19 by which the detecting signals may be corrected. Examples of each of the detected signals of the detectors 18 and 24 and each of the output signals of the logarithmic amplifiers 25 and 26 are shown in FIG. 6A and FIG. 6B.

Figure 8A:
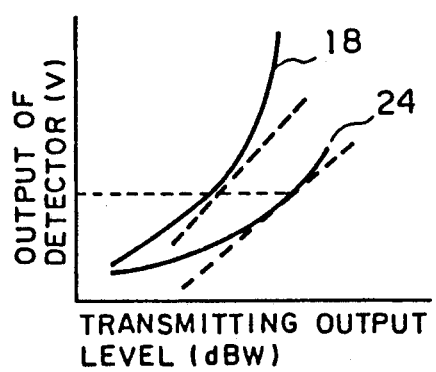
Figure 8B:
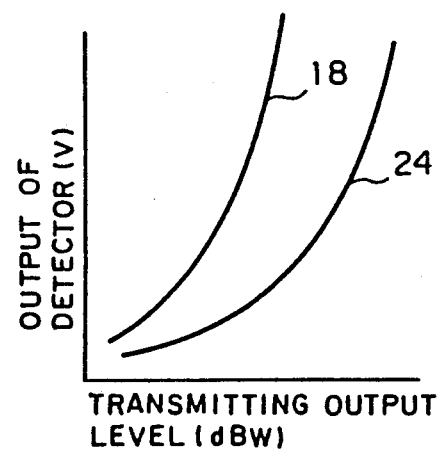
Figure 8C:
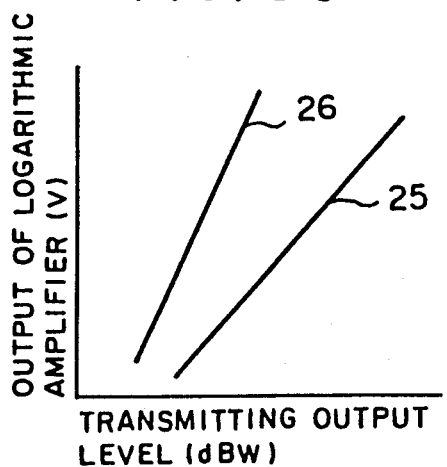
Figure 8D:
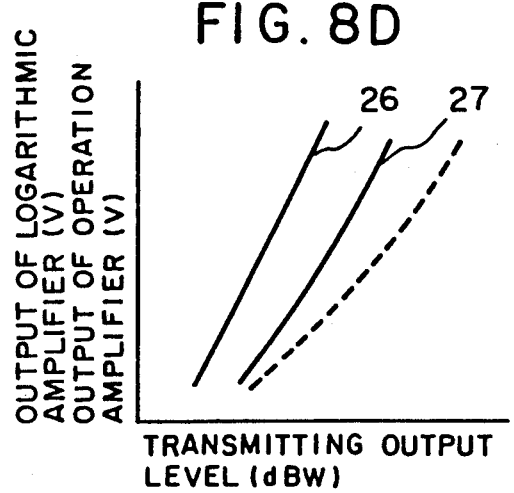
Figure 7:
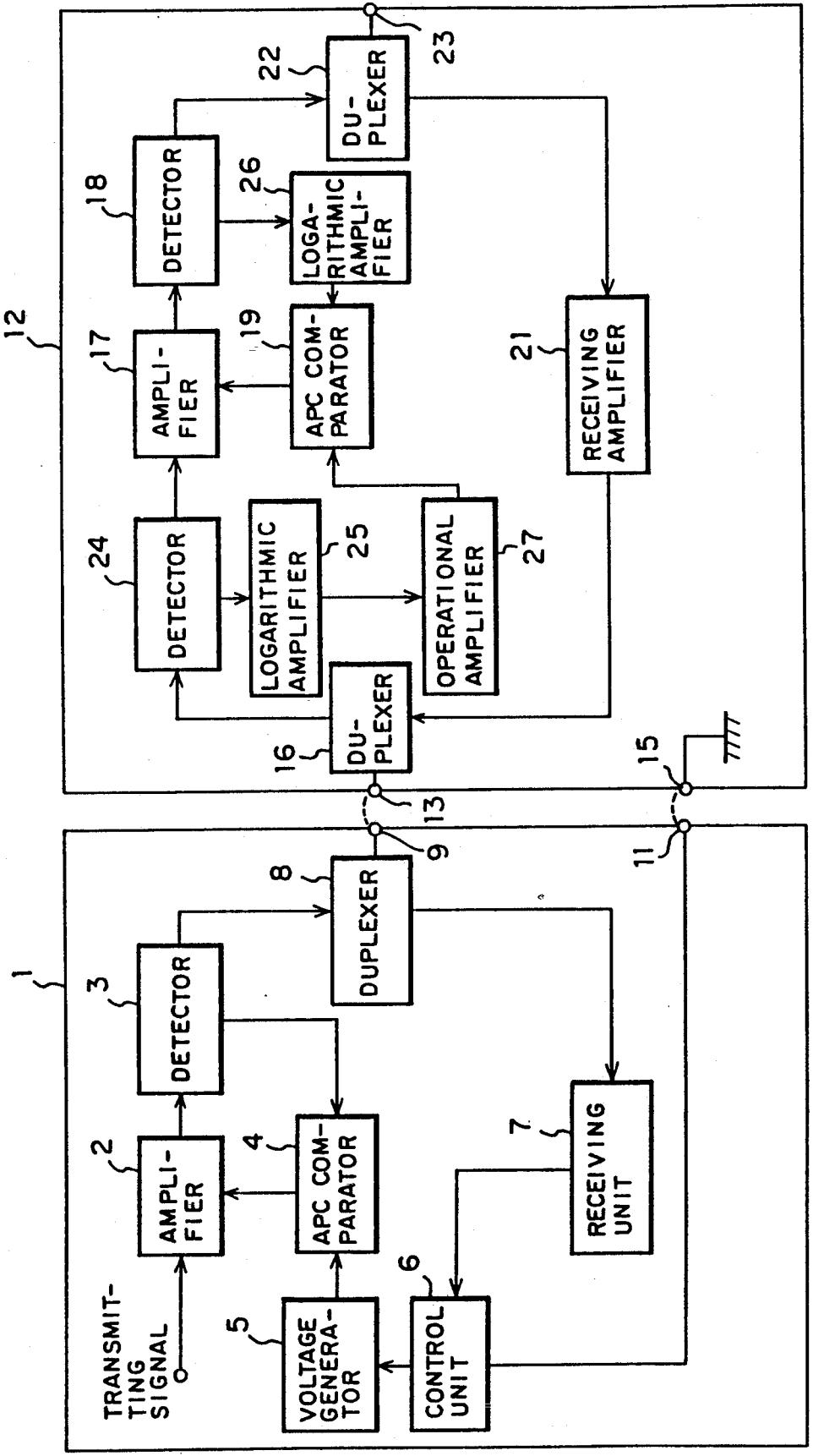

In the case where the slope characteristics between the output signal of the detector 24 and that of the detector 18 are widely different from each other (For example, the case as shown in FIG. 8A), the logarithmic amplifiers 25 and 26 are provided to improve linearity. In addition, the operational amplifier 27 may be added as an input power detecting means between the logarithmic amplifier 25 and the APC comparator 19 as shown in FIG. 7. Thus, the output signal of the logarithmic amplifier 25 can be linearized. The output diagram as shown in FIG. 8B is corrected into the output diagram as shown in FIG. 8C by the logarithmic amplifiers 25 and 26, and further corrected into the output diagram as shown in FIG. 8D by the operational amplifier 27.

FIG. 9 is a block diagram showing a radio transceiver according to another embodiment of this invention. In FIG. 9, reference numeral 28 is a level signal terminal which is provided in the booster apparatus 12 and supplied with a DC voltage output from the detector 18. Level input terminal 29 is provided in the radio transceiver 1 and supplied with the above-mentioned DC voltage from terminal 28. Element 30 represents a booster power source unit connected to power supply terminal 31 and a power input terminal 32. Control unit 6a is added with a level deciding means as in the control unit 6 in each of the above-mentioned embodiments. Also, power source 30 for the booster apparatus 12 is supplied from the radio transceiver 1.

Next, the operation will be described. In the case where the booster apparatus 12 is not connected to the radio transceiver, the radio transceiver 1 performs communication in the same way as in the conventional case and the above-mentioned embodiments. In the case where the booster apparatus 12 is connected to the radio transceiver 1, the level input terminal 29 and the level signal terminal 28 are connected with each other as illustrated by the dotted line, and the power supply connecting terminal 31 and the power input terminal 32 are similarly connected with each other. In this state, the operation for sending out the transmitting signal with the output level in accordance with the transmitting level specified from the base station is the same as the operations of the above-mentioned respective embodiments. Accordingly, the description will be omitted.

However, according to a further aspect of the invention, the level deciding means of the control unit 6a monitors the transmitting output level of the booster apparatus 12 via the detector 18, the level signal terminal 28, and the level input terminal 29 even when the transmitting signal is not sent out. Since the control unit 6a controls the radio transceiver 1, it can instantly recognize whether the transmitting signal is sent out or not. In the case where the booster apparatus 12 has transmitted an output but without transmission, such as can result from oscillations and so forth in the amplifier 17, the control unit 6a can detect when a DC voltage which the detector 18 outputs has exceeded a predetermined level. In such a case, the control unit 6a outputs a logic level 1 to the power source 30 for the booster. Then, the power source 30 for the booster functions so as to cut off the power source (PS) from the power supply terminal 31.

Figure 10:
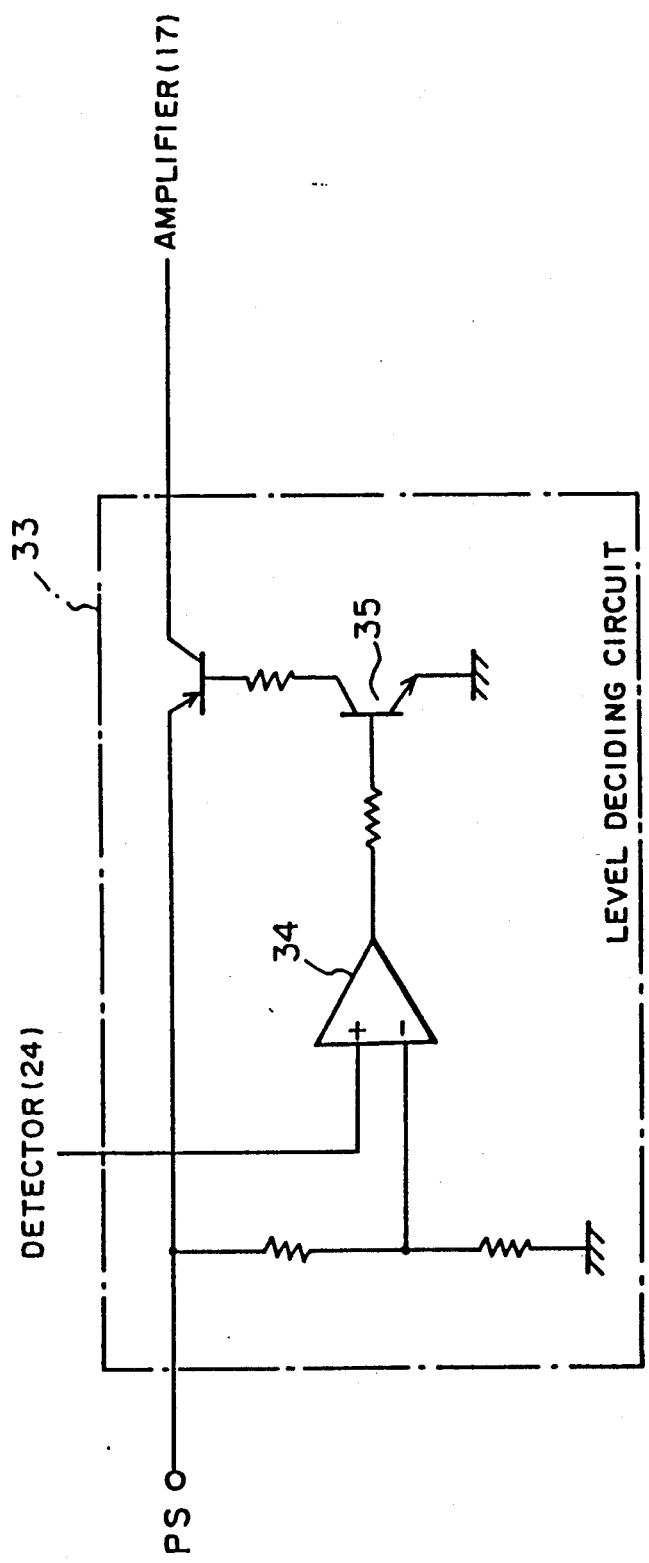
Figure 10:
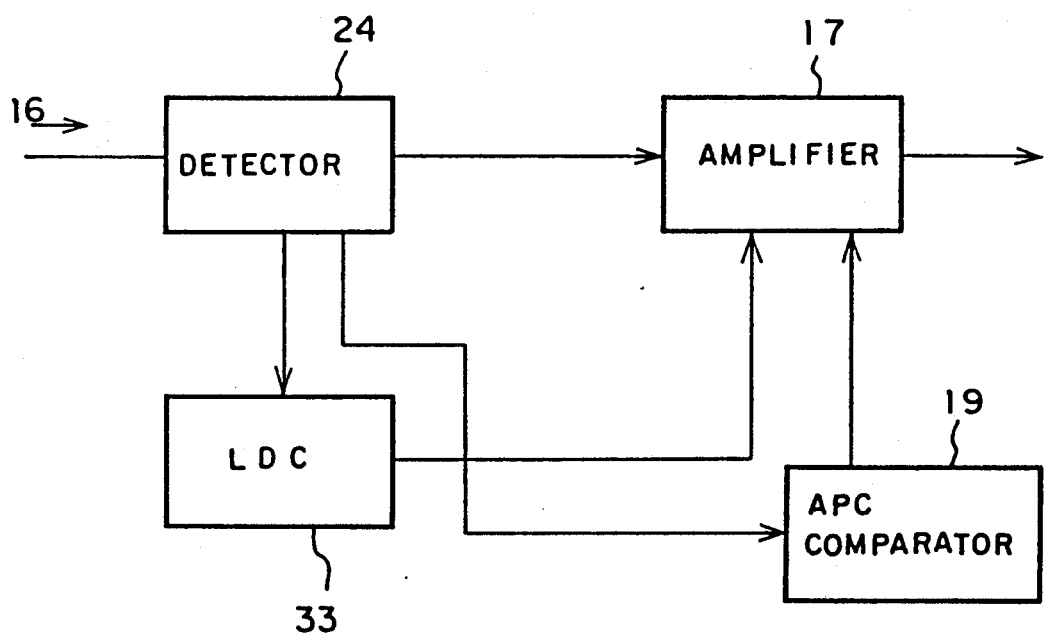

In a further embodiment of the present invention, the unlawful transmission of signals can be prevented by introducing the DC voltage output by detector 24 into and the level deciding circuit 33 as shown in FIG. 10 for comparing the DC voltage with a predetermined level. FIG. 10A further illustrates the arrangement of level deciding circuit in booster apparatus 12. In this case, when the DC voltage level of the detector 24 is not less than the level of the minimum transmitting signal level which is input to the booster apparatus 12, the level deciding circuit 33 functions so as to supply power to the amplifier 17. While the reference voltage of the comparator 34 shown in FIG. 10 is rendered a level of the minimum transmitting signal, the power source (PS) needs only to be switched by the transistor 35 in order to cut off power to amplifier 17. Therefore, when the signal level falls below the minimum transmitting signal level, power is cut off to amplifier 17.

As described above, the power source applied to the amplifier 17 is controlled, allowing transmission of unlawful signals to be prevented.

The above-mentioned respective embodiments (those shown in FIG. 9 and FIG. 10) can be, of course, added with the logarithmic amplifiers 25 and 26 and the operational amplifier 27 shown in FIG. 5 or FIG. 7.

As mentioned above, since the booster apparatus and the radio transceiver are constructed in such a manner that the transmitting output level in accordance with the level information is always controlled by the radio transceiver, and the transmitting signal is amplified with a fixed gain in the booster apparatus, control signals between the main body of the radio transceiver and the booster apparatus can be eliminated, thus simplifying construction. In addition, if the booster apparatus is constructed to include the level deciding circuit, the transmission of unlawful signals can be prevented.

What is claimed is:

1. A radio transceiver with booster apparatus comprising:
    said booster apparatus comprising:
    a signal terminal for receiving a transmitting signal which is to be amplified and for outputting a received signal which is received from an external transmission source;
    an amplifier connected to receive said transmitting signal from said signal terminal and which amplifies said transmitting signal supplied from said signal terminal;
    an input power detecting means which detects the signal level of said transmitting signal which is inputted to said amplifier;
    a transmitting power detecting means which detects the signal level of the output signal of said amplifier;
    a transmitting level setting means which receives a first detected signal output by said input power detecting means and a second detected signal output by said transmitting power detecting means, and causes the signal level of the output signal of said amplifier to set the gain of said amplifier in a fixed relation such that the signal level of said second detected signal is in a fixed relation with said first detected signal;
    means for outputting the amplified transmitting signal to an antenna connecting terminal for the booster apparatus and supplying a received signal input to said antenna connecting terminal for the booster apparatus to said signal terminal; and
    a connecting terminal which provides a connecting signal to the radio transceiver;
    said radio transceiver comprising:
    an antenna connecting terminal to which said signal terminal of said booster apparatus or an antenna is connected;
    a receiving unit which demodulates a received signal input to said antenna connecting terminal;
    a detecting terminal connected to said antenna connecting terminal;
    a control unit which includes means for receiving transmitting output level information included in a received signal demodulated by said receiving unit and means for receiving a connecting signal which is received at said detection terminal, said control unit further including means for outputting a selection signal corresponding to said transmitting output level information for controlling the operational class of operation of said transceiver;
    a second amplifier for amplifying a transmitting signal supplied to said transceiver;
    an output power detecting means which detects the signal level of the output signal of said second amplifier; and
    a second transmitting level setting means for receiving said selection signal and a third detected signal output from said output power detecting means and for setting the gain of said second amplifier as the signal level of the output signal of said second amplifier becomes a fixed value.

2. A radio transceiver with booster apparatus according to claim 1, wherein said input power detecting means comprises a first detector which detects said input signal to generate a first DC voltage, and said transmitting power detecting means includes a second detector which detects said output signal to generate a second DC voltage.

3. A radio transceiver with booster apparatus according to claim 2, wherein said first transmitting level setting means is a first automatic power control comparator which receives said first and second DC voltages output by said first and second detectors and outputs a signal which is adjusted until these DC voltages come to equal values.

4. A radio transceiver with booster apparatus according to claim-3 wherein said first automatic power control comparator comprises an adjuster which adjusts the DC voltage generated by said first detector and an operational amplifier which receives an output voltage of the adjuster and a DC voltage generated by said second detector and outputs a signal as these voltages are balanced.

5. A radio transceiver with booster apparatus according to claims 3 or 4, wherein said input power detecting means further comprises a logarithmic amplifier provided between said detector and said automatic power control comparator, and said transmitting detecting means further comprises a second logarithmic amplifier provided between said second detector and said automatic power control comparator.

6. A radio transceiver with booster apparatus according to claim 5, wherein said input power detecting means further comprises an operational amplifier provided between said logarithmic amplifier and said automatic power control comparator.

7. A radio transceiver with booster apparatus according to claim 4, wherein said output power detecting means comprises a third detector which detects an output signal of said second amplifier to generate a third DC voltage.

8. A radio transceiver with booster apparatus according to claim 7 wherein said second transmitting level setting means comprises a voltage generator and a second automatic power control comparator.

9. A radio transceiver with booster apparatus according to claim 8 wherein said voltage generator comprises a number of resistors corresponding to the number of levels of level information, said voltage generator further comprises a selector which selects a resistor from said number of resistors in accordance with said selection signal and a voltage dividing resistor which divides a fixed voltage to generate a reference voltage in accordance with the resistor selected by the selector.

10. A radio transceiver with booster apparatus according to claim 9, wherein said second automatic power control comparator comprises an operational amplifier which receives a DC voltage output by said third detector and said reference voltage to output a signal for balancing these voltages to said second amplifier.

11. A radio transceiver with booster apparatus according to claims 9 or 10, wherein said control unit comprises means for selecting the resistor irrespective of the operational class of said transceiver.

12. A radio transceiver with booster apparatus according to any one of claims 1–4, comprising a level deciding means which comprises means for cutting off the power supplied to said first amplifier when said level deciding means detects that said radio transceiver does not output said transmitting signal.

13. A radio transceiver with booster apparatus according to claim 11, comprising a level deciding means which detects that said radio transceiver does not output said transmitting signal, and cuts off the power supply to said first amplifier in response thereto.

14. A radio transceiver with booster apparatus according to claim 13, wherein said level deciding means comprises a level signal terminal which is provided in said booster apparatus for receiving the DC voltage output of said second detector to output said DC voltage externally from said booster apparatus, a level input terminal which is provided in the radio transceiver for receiving the DC voltage of said second detector from said level signal terminal to supply it to said control unit, and a cut off means which is provided in said control unit for comparing the DC voltage of said second detector with a predetermined value and outputting a signal for cutting off the power supplied to said first amplifier if the DC voltage exceeds said predetermined value.

15. A radio transceiver with booster apparatus according to claim 14, wherein said control unit further comprises a means which operates said cutting off means when the transmitting signal is output.

16. A radio transceiver with booster apparatus according to claim 15, wherein said level deciding means comprises a level deciding circuit which is provided in said booster apparatus, said level deciding circuit receives said second DC voltage output by said second detector and outputs a signal for cutting off the power supplied to said first amplifier when said second DC voltage is one corresponding to a state in which a transmitting signal does not exist.

17. A booster apparatus comprising:
a signal terminal for receiving a transmitting signal which is to be amplified and for outputting a received signal which is received from an external transmission source;
an amplifier connected to receive said transmitting signal from said signal terminal and which amplifies said transmitting signal supplied from said signal terminal;
an input power detecting means which detects the signal level of said transmitting signal which is inputted to said amplifier;
a transmitting power detecting means which detects the signal level of the output signal of said amplifier;
a transmitting level setting means which receives a first detected signal output by said input power detecting means and a second detected signal output by said transmitting power detecting means, and causes the signal level of the output signal of said amplifier to set the gain of said amplifier such that said signal level of said second detected signal is maintained in a fixed relation with said first detected signal; and
means for outputting the output signal of said amplifier to an antenna connecting terminal for the booster apparatus and supplying a received signal input to said antenna connecting terminal for the booster apparatus to said signal terminal.

18. A booster apparatus according to claim 17, wherein said input power detecting means comprises a first detector which detects said input signal and generates a DC voltage, and said transmitting power detecting means comprises a second detector which detects said output signal and generates a DC voltage.

19. A booster apparatus according to claim 18 wherein said transmitting level setting means is an automatic power control comparator which receives the DC voltages output by said first and second detectors and outputs to said amplifier a signal which is adjusted until these DC voltages come to equal values.

20. A booster apparatus according to claim 19, wherein said automatic power control comparator comprises an adjuster which adjusts a DC voltage generated by said first detector and an operational amplifier which receives the output voltage of said adjuster and the DC voltage generated by said second detector, and outputs a signal which is a function of the difference between these DC voltages to said amplifier.

21. A booster apparatus according to claim 19 or claim 20, wherein said input power detecting means further comprises a logarithmic amplifier provided between said first detector and said automatic power control comparator and said transmitting power detecting means further comprises a second logarithmic amplifier provided between said second detector and said automatic power control comparator.

22. A booster apparatus according to claim 21, wherein said input power detecting means further comprises an operational amplifier provided between said logarithmic amplifier and said automatic power control comparator.

* * * * *

UNITED STATES PATENT AND TRADEMARK OFFICE
CERTIFICATE OF CORRECTION

PATENT NO. : 5,146,614
DATED : September 8, 1992
INVENTOR(S) : Kenichi Furuno

It is certified that error appears in the above-identified patent and that said Letters Patent is hereby corrected as shown below:

Column 2, line 41, "a" (first occurrence) should be
    --6a--;
        line 65, after "21." and beginning with the
    word "Since", start a new paragraph.

Column 6, line 12, after "case" insert --where three
    signals of level information "000", "001"--;
        line 29, after "level" insert --from the
    radio transceiver 1 is set lower, for example,--.

Column 8, line 49, "detecting" should be
    --detection--.

Signed and Sealed this

Twenty-eighth Day of December, 1993

Attest:

BRUCE LEHMAN

*Attesting Officer*          *Commissioner of Patents and Trademarks*